Feb. 14, 1939.  C. G. OLSON  2,147,211
FASTENING DEVICE
Filed May 29, 1936
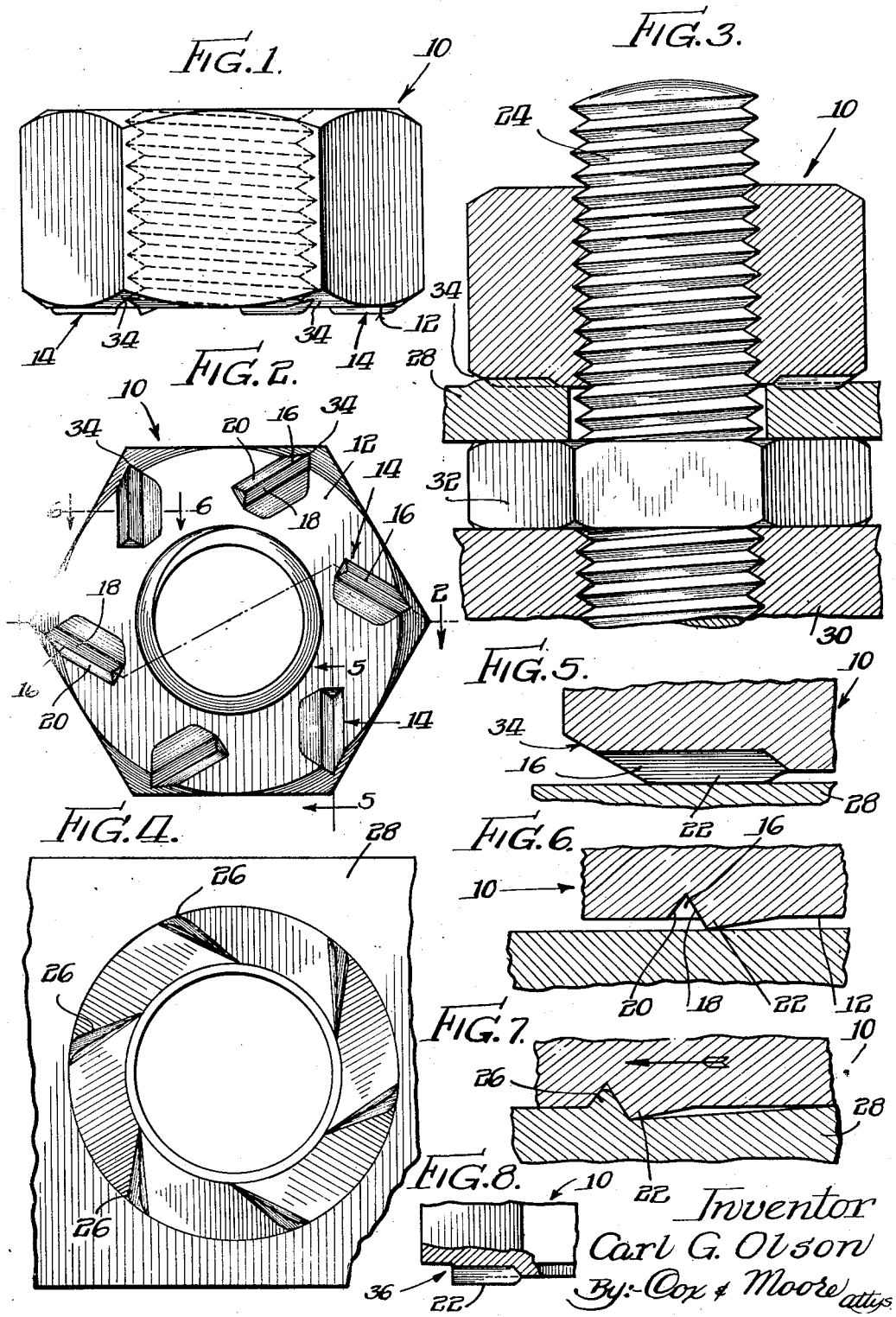
Inventor
Carl G. Olson
By:-Cox & Moore attys Patented Feb. 14, 1939

2,147,211

UNITED STATES PATENT OFFICE 2,147,211

FASTENING DEVICE

Carl G. Olson, Chicago, Ill., assignor to Illinois Tool Works, Chicago, Ill., a corporation of Illinois Application May 29, 1936, Serial No. 82,388

5 Claims. (Cl. 151—35)

This invention relates generally to locking means for threaded elements of the general class shown and described in my Patent No. 2,037,586, dated April 14, 1936, and more particularly to the type of locking means wherein material of the work is adapted to be circumferentially and radially shifted with respect to the rotary threaded fastener in securing said fastener against retrograde movement.

My invention contemplates threaded fasteners such as nuts, screw heads and the like having the clamping surfaces thereof equipped with means for acting upon the surfaces of the work so as to crowd material of the work into confines or indentations of particular design disposed along the clamping surface of the fastener.

It is also an object of the present invention to provide locking means for threaded clamping members such as nuts and screw heads, whereby sections of the work are not only shifted or crowded into the confines of the clamping member, but also whereby any loose or foreign material separated from the work surface during the tightening operation will be properly ejected.

In addition to providing means for threaded elements which will effectively secure said parts against loosening, I also propose to so configurate the work surface as to insure metal-to-metal contact when the clamping member and work are tightened.

More specifically, the invention contemplates crowding material of the work within confines or indentations located on a rotary clamping surface in a direction tangential to a circle concentric with the work aperture so as to effectively secure against retrograde movement thereof.

The foregoing and numerous other objects and advantages will be more apparent from the following description when considered in connection with the accompanying drawing, wherein—

Figure 1 is a side elevational view of a fastening member or nut having the clamping surface thereof equipped with locking sections conforming with the teachings of the present invention;

Figure 2 is a view of the underside of the clamping member or nut shown in Figure 1;

Figure 3 discloses the nut of Figure 1 in central vertical section tightened against a work piece, said view being taken substantially along the line 2—2 of Figure 2;

Figure 4 is a plan view of a work piece which has been acted upon by the locking sections of the nut shown in Figures 1 to 3, inclusive, the nut being detached to more clearly illustrate the tangential ridges or abutments which are formed by said locking sections;

Figure 5 is an enlarged fragmentary transverse sectional view of one of the locking sections taken substantially along the line 5—5 of Figure 2;

Figure 6 is a transverse sectional view of one of the locking sections taken substantially along the line 6—6 of Figure 2, disclosing the locking section inwardly engaging the surface of the work;

Figure 7 discloses the position occupied by the locking section and work when the locking section has been shifted so as to crowd material of the work into the indentation; and Figure 8 is a fragmentary sectional view taken across one corner of the nut in the vicinity of the clamping surface to illustrate the manner in which an annular groove provides an opening for the outer extremities of the indentations of each locking section.

Referring now to the drawing wherein I have employed like numerals to designate similar parts throughout the various figures, it will be seen that one embodiment of my invention contemplates a threaded clamping member or nut 10 having a clamping surface 12. Disposed along the clamping surface 12 is a plurality of locking sections, which I have designated generally by the numeral 14.

Each of the locking sections 14 includes an indentation or recess 16 extending tangentially with respect to a circle concentric with the axis of the nut. This indentation 16 is bounded on one side by a surface 18 angularly disposed with respect to the clamping surface 12, and on the other side by a trailing or abutment surface 20. These surfaces 18 and 20 converge toward each other and extend into the confines of the nut body 10. The surface 18 extends axially beyond the clamping surface 12 and forms the advancing side of a projection or work shifting element 22.

From the semi-diagrammatic representation in Figures 6 and 7 it will be understood that, as the nut 10 experiences its final tightening or clamping movement, for example, when the nut is tightened upon the threaded stud 24 shown in Figure 3, the projection 22 causes a section 26 of a work piece or metallic sheet 28 to be shifted or crowded into the indentation 16. The thread helix on the stud 24 coacting with the complementary internal thread of the nut 10 determines the degree of axial movement per unit of rotary or circumferential movement experienced by the projection 22 after it has initially engaged the work 28. Obviously, for purposes of illustration, the degree of axial projection of the element 22 beyond the clamping surface 12 (as shown in Figures 6 and 7) has been somewhat exaggerated.

Particular attention is directed to the fact that the tangential disposition of the recesses 16 and their complementary work shifting elements 22 causes material of the work to be shifted not only circumferentially into locking association with the abutment surfaces 20, but also to experience radial shifting. It has been found that, after the nut 10 has been completely tightened or clamped against the surface of the work 28, the shifted work sections or abutments 26 will appear substantially as indicated in Figure 4. In other words, the outer portions of these work sections 26 are greater in cross-sectional area than the inner sections. This is due to the tendency of the shifted work to crowd outwardly or radially because of the tangential disposition of the locking sections 14. This tangential arrangement of the locking sections 14 presents the advantage of causing the material shifted by the projections or elements 22 to experience a normal tendency to move outwardly or radially. Thus, if the nut is clamped against a coated surface so as to require the elements 22 to first scrape or dislodge the coating and subsequently cause the shifting or flowing of metal in the work, these dislodged coating particles will be automatically urged or ejected at the outer extremities of the indentations 16. It will be noted that the outer extremities of these indentations are open so as to effectively permit of the automatic egress of any foreign material to make way for the metal of the work.

The above mentioned tangential arrangement of the locking sections 14 not only provides an effective means for securing the clamping member or nut against retrograde movement, but also insures metal-to-metal contact between the nut and work. This is of importance where a fastening element, such as the nut 10, must be tightened against a coated or enameled surface and it is desirable to insure metal-to-metal contact between the nut and work—for example, in instances where it is necessary to insure electrical contact. The enamel or other material forming the coating on the work is sufficiently ejected prior to the building up or crowding of the work section 26 into the confines of the nut, thereby insuring metal-to-metal contact.

In Figure 3 I have disclosed one practical application of the nut 10, which has proven very satisfactory in the field. In this application the stud 24 is mounted at one extremity within a suitable base or support 30, and a central or nut portion 32 of the stud is also tightened against the outer surface of the support 30. The work or metallic sheet 28 is then slipped over the free end of the stud 24 and the nut 10 tightened against the work. In this manner the use of any auxiliary fastening device, such as a lock washer or similar device—is precluded. It is desirable to harden the locking sections, or at least the projecting elements 22 thereof, sufficiently to enable said elements to dig into and cause the effective shifting of the work material without subjecting the elements 22 to any substantial disfigurement or injury.

I have found it convenient and practical to form the locking sections 14 by practicing a simple method of indentation. A suitable tool forming in cross-section a counterpart of the locking section 14 is forced against the clamping surface 12, thereby causing the formation of the indentation 16 and the outward flowing of the metal of the nut sufficiently to produce the projection 22.

Attention is directed to the fact that I prefer to so arrange the clamping surface 12 that, when the indentations 16 are made by the tool (not shown), the outer extremities of the indentations will be open. One method whereby these open ends may be assured is the slight chamfering of the clamping surface 14 at the corners indicated by the numeral 34. Thus, when the indentations or recesses 16 are formed, they will open outwardly into the area presented as a result of the chamfers 34. By providing these chamfers on both sides of the nut, the indentations may be formed on either surface. If it is not desired to chamfer the corners of the clamping surface, a slight annular peripheral groove may be provided, as indicated by the numeral 36 in Figure 8. However, the provision of this annular groove makes it necessary to form the locking sections 14 on only one side of the nut, namely the side provided with a groove, whereas, by providing the slight chamfers 34, either side of the nut may be formed with the locking sections.

From the foregoing it will be apparent that my invention contemplates an improved fastening including a plurality of elongated ribs or sections of the work surface, each presenting a substantially rigid unsevered mass extending into the confines of the fastener body. The locking sections being located in skewed relation on the clamping surface in such a manner as to be non-radial, or in a direction tangential to a circle concentric with the fastener axis or the axis of the work aperture to cause this elongated substantially rigid unsevered mass of the work extending non-radially with respect to the fastener to provide a very effective fastening. Causing the material of the work to be shifted both circumferentially and radially because of the aforesaid tangential or non-radial disposition of the locking sections provides the ribs or sections 26, which are greater in cross-section at one extremity than at the other. These rigid sections of the work provide a most efficient means for preventing retrograde rotation of the threaded fastener, and thus cooperate in producing a very efficient fastening between the work and the nut or screw head.

Obviously the invention is not limited to the particular structural features disclosed herein, but is capable of other modifications and changes without departing from the spirit and scope of the appended claims.

Having thus described my invention, what I claim as new and desire to secure by Letters Patent is:

1. A rotary fastener adapted to be clamped against the surface of a work piece including a rotary threaded body, and a locking section on said body associated with the clamping side thereof including an indentation providing an abutment section and an element extending out of radial alinement with said body adapted in response to rotary tightening movement experienced by the body to cause a section of the work piece positioned laterally outward from the threaded portion of the body to be crowded into said indentation whereby to prevent loosening of the fastener.

2. A rotary fastener adapted to be clamped against the surface of a work piece including a rotary threaded body, and a locking section on said body associated with the clamping side thereof including an abutment section and a straight element extending in a direction tangential to a circle concentric with the axis of the body adapted in response to rotary tightening movement experienced by the body to cause a section of the work piece positioned laterally outward from the threaded portion of the body to be shifted into locking association with said abutment section whereby to prevent loosening of the fastener.

3. A rotary fastener adapted to be clamped against the surface of a work piece including a rotary threaded body, and a locking section on said body associated with the clamping side thereof including an abutment section and a straight element extending out of radial alinement with respect to the axis of said body adapted in response to rotary tightening movement experienced by the body to cause a section of the work piece positioned laterally outward from the threaded portion of the body to be shifted into locking association with said abutment section whereby to prevent loosening of the fastener.

4. A rotary fastener adapted to be clamped against the surface of a work piece including a rotary threaded body, and a locking section on said body associated with the clamping side thereof including an indentation extending non-radially with respect to the axis of said body and providing an abutment section and an element extending out of radial alinement with said body adapted in response to rotary tightening movement experienced by the body to cause a section of the work piece positioned laterally outward from the threaded portion of the body to be crowded into said indentation whereby to prevent loosening of the fastener 5. A rotary fastener adapted to be clamped against the surface of a work piece including a rotary threaded body, and a locking section on said body associated with the clamping side thereof including an indentation extending non-radially with respect to the axis of said body and providing an abutment section and an element extending out of radial alinement with said body adapted in response to rotary tightening movement experienced by the body to cause a section of the work piece positioned laterally outward from the threaded portion of the body to be crowded into said indentation whereby to prevent loosening of the fastener, a portion of said indentation terminating at the outer margin of said rotary threaded body to permit the ejection therefrom of material dislodged from the surface of the work piece during the tightening rotation of said body.

CARL G. OLSON.